United States Patent [19]

Shinpo et al.

[11] Patent Number: 5,025,678
[45] Date of Patent: Jun. 25, 1991

[54] COLUMN SHIFT LEVER DEVICE

[75] Inventors: Yoshiharu Shinpo, Toyota; Motoharu Akiyama, Chiryu, both of Japan

[73] Assignees: Toyota Jidosha Kabushiki Kaisha, Toyota; Mannoh Kogyo Co., Ltd., Anjo, both of Japan

[21] Appl. No.: 399,964

[22] Filed: Aug. 29, 1989

[30] Foreign Application Priority Data

Sep. 2, 1988 [JP] Japan .......................... 63-115822[U]

[51] Int. Cl.$^5$ .......................................... B60K 20/06
[52] U.S. Cl. ................................ 74/473 SW; 74/475; 74/476; 74/477; 74/483 K; 180/78
[58] Field of Search ................ 74/473 SW, 475, 476, 74/477, 483 K; 192/4 A; 180/315, 334, 336, 78

[56] References Cited

U.S. PATENT DOCUMENTS

| | | | |
|---|---|---|---|
| 2,402,842 | 6/1946 | Rhodes | 74/475 |
| 2,905,016 | 9/1959 | Gorsky | 74/475 |
| 3,180,175 | 4/1965 | Brook | 74/476 |
| 3,646,828 | 3/1972 | Milton et al. | 74/473 SW X |
| 3,942,614 | 3/1976 | Thompson | 74/483 K X |
| 4,070,914 | 1/1978 | Reinhardt et al. | 74/475 |
| 4,096,930 | 6/1978 | Viscardi | 74/483 K X |
| 4,531,422 | 7/1985 | Yarnell | 74/475 |
| 4,762,015 | 8/1988 | Katayama | 74/473 SW |
| 4,934,208 | 7/1990 | Carlstrom | 74/473 SW |
| 4,936,431 | 7/1990 | Shinpo | 74/473 SW X |

FOREIGN PATENT DOCUMENTS

| | | |
|---|---|---|
| 1946496 | 3/1971 | Fed. Rep. of Germany ........ 74/477 |
| 62-214023 | 9/1987 | Japan .................................. 180/336 |
| 63-15229 | 2/1988 | Japan . |
| 63-16932 | 2/1988 | Japan . |
| 63-134824 | 9/1988 | Japan . |

Primary Examiner—Allan D. Herrmann
Assistant Examiner—Benjamin Levi
Attorney, Agent, or Firm—Oblon, Spivak, McClelland, Maier & Neustadt

[57] ABSTRACT

A column shift lever device operatively connected to an automatic transmission of a motor vehicle and supported by a steering column which has a tiltable upper portion supporting a steering wheel. The column shift lever device includes a shift lever; a tubular control shaft having at least one axially extending elongate hole formed therethrough; an inner shaft accomodated within the tubular control shaft, which has a fastener member protruding therefrom through the above-indicated at least one elongate hole, so that the inner shaft is axially movable relative to and rotatable with the control shaft; a stationary cylindrical outer casing for rotatably supporting the control shaft at a portion thereof below the tiltable upper portion; a detent device having a detent pin for locking the shift lever in one of a plurality of shift positions corresponding to a plurality of operating positions of the automatic transmission. The detent means includes a detent support sleeve which supports the detent pin and which is connected to the inner shaft through the fastener member. The column shift lever further includes a splined engaging device provided between an outer circumference of the control shaft and an inner circumference of the detent support sleeve, for permitting a relative axial movement and a concurrent rotation of the control shaft and the detent support sleeve.

7 Claims, 3 Drawing Sheets

COLUMN SHIFT LEVER DEVICE

BACKGROUND OF THE INVENTION

1. Field of the Invention

The present invention relates in general to a column shift lever device operatively connected to an automatic transmission of a motor vehicle, and more particularly to such a column shift lever device supported by a steering column having a tiltable upper portion with a steering wheel fixed at its upper end.

2. Discussion of the Prior Art

There is known a column shift lever device which has a shift lever, and a tubular control shaft to which the shift lever is connected and which extends substantially in parallel with a steering column. The control shaft is supported at its axially opposite end portions by the steering column.

Where the conventional column shift lever device is mounted on the steering column of a type which has a tiltable upper portion for supporting a steering wheel so that the position of the steering wheel is adjustable in the running direction of the vehicle, a support member for connecting the upper end portion of the control shaft to the steering column must be located below the tiltable upper portion of the steering column. In this case, the column shift lever device must be considerably modified from that used with a non-tiltable steering column, and the required operating angle of the shift lever tends to be large.

To solve the above problems, there has been developed a column shift lever device as disclosed in laid-open Publication Nos. 63-15229 and 63-16932 of unexamined Japanese Utility Model Applications. The disclosed column shift lever device is fixedly attached to the steering column by means of a bracket disposed therebetween, such that a portion of the bracket passes through a relatively large aperture formed through a tubular control shaft of the column shift lever device. In this case, however, the control shaft suffers from low rigidity owing to the presence of the relatively large aperture.

In the conventional column shift lever device linked to an automatic transmission having a plurality of operating positions including forward and reverse drive positions, the shift lever is operated by a vehicle driver for placing the lever in a selected one of a plurality of shift positions, so as to establish a desired one of the operating positions of the transmission. This operation of the shift lever by the driver is affected by means of a detent device installed in an engine room of the vehicle, so that the shift lever is suitably locked into and released from the currently selected shift position. To eliminate the space of the engine room occupied by the detent device, it is proposed to position such a detent device on a portion of the column shift lever device which is located within the driver's compartment. In this case, however, the control shaft must be provided with a hole or an aperture or the like, which also results in lowering the rigidity of the column shift lever device.

SUMMARY OF THE INVENTION

The present invention was developed in view of the above problems or drawbacks encountered in the prior art. It is accordingly an object of the invention to provide a column shift lever device operatively connected to an automatic transmission and supported by a steering column having an tiltable upper portion, which column shift lever device has an improved rigidity even with a detent device installed thereon.

The above object may be accomplished according to the principle of the present invention, which provides a column shift lever device operatively connected to an automatic transmission of a motor vehicle and supported by a steering column which has a tiltable upper portion supporting a steering wheel, which column shift lever device comprises a shift lever which is manipulated by a vehicle driver so as to place the automatic transmission in one of a plurality of operating positions; a tubular control shaft having an upper end to which the shift lever is connected, the tubular control shaft having at least one axially extending elongate hole formed therethrough; an inner shaft accommodated within the tubular control shaft, the inner shaft having a fastener member protruding therefrom through the above-indicated at least one elongate hole, so that the inner shaft is axially movable relative to and rotatable with the control shaft; a stationary cylindrical outer casing disposed around the control shaft in coaxial relationship therewith, for rotatably supporting the control shaft at a portion thereof below the tiltable upper portion; detent means having a detent pin for locking the shift lever in one of a plurality of shift positions corresponding to the operating positions of the automatic transmission, the detent means including a detent support sleeve which supports the detent pin and which is connected to the inner shaft through the fastener member; and splined engaging means provided between an outer circumference of the control shaft and an inner circumference of the detent support sleeve, for permitting a relative axial movement and a concurrent rotation of the control shaft and the detent support sleeve.

In the column shift lever device of the present invention constructed as described above, when the driver pulls up the shift lever, the inner shaft having the fastener member is axially moved to cause the detent support sleeve of the detent means to be moved in the same axial direction, by means of the fastener member which is connected to the detent support sleeve through the elongate hole or holes axially formed through the control shaft. The splined engaging means permits the axial movement of the detent support sleeve relative to the control shaft. When the driver subsequently manipulates the shift lever to affect a shifting operation of the transmission, the inner shaft is rotated with the control shaft which is rotatably supported by the stationary cylindrical outer casing. Consequently, the detent support sleeve which engages the control shaft through the splined engaging means is rotated with the inner shaft and the control shaft.

The present column shift lever device has the cylindrical outer casing provided so as to rotatably support the control shaft, whereby the rigidity of the column shift lever device is significantly improved. Further, the detent means is mounted on the control shaft through the splined engaging means, without lowering the rigidity of the column shift lever device. The provision of the detent means on the column shift lever device eliminates the conventionally required space in the engine room of the vehicle.

In one form of the present invention, the column shift lever device further comprises a bracket secured to the cylindrical outer casing and the steering column, for fixing the control shaft to the steering column.

In another form of the invention, the column shift lever device further comprises an outer sleeve fixedly fitted on the outer circumference of the control shaft and having axial splines formed over an outer circumferential surface thereof.

According to one feature of the above form of the invention, the splined engaging means consists of the axial splines of the outer sleeve and corresponding keyways formed in an inner circumferential surface of the detent support sleeve, the axial splines engaging the keyways so that the detent support sleeve is axially slidable on the outer sleeve.

According to another feature of the same form of the invention, the outer sleeve has at least one axially extending elongate hole through which the fastener member extends for connection to the detent support sleeve of the detent means.

In a further form of the invention, the detent means further includes a stationary detent plate having a plurality of notches which correspond to the operating positions of the automatic transmission, the detent pin engaging one of the plurality of notches so as to establish a corresponding one of the operating positions of the automatic transmission. In this case, the detent plate is secured to the cylindrical outer casing, while the detent support sleeve is rotatable and axially movable with the inner shaft.

In a still further form of the invention, the operating positions of the automatic transmission has a parking position, a reverse drive position, a neutral position, and a plurality of forward drive positions.

According to one feature of the above form of the invention, the column shift lever device further comprises a safety lock device operable when the automatic transmission is placed in the parking position while a brake pedal of the vehicle is placed in a released position. The safety lock device may include a pin which is engageable with a groove formed in an outer circumferential surface of the inner shaft.

The column shift lever device of the invention may further include a return spring for biasing the inner shaft, such that the detent means has a locking position for locking the shift lever and a release position, and such that the return spring is adapted to bias the inner shaft in a direction from the release position toward the locking position.

BRIEF DESCRIPTION OF THE DRAWINGS

The above and other objects, features and advantages of the present invention will be better understood by reading the detailed description of the presently preferred embodiment, when considered in conjunction with the accompanying drawings, in which.

DETAILED DESCRIPTION OF THE PREFERRED EMBODIMENT

Figure 1:
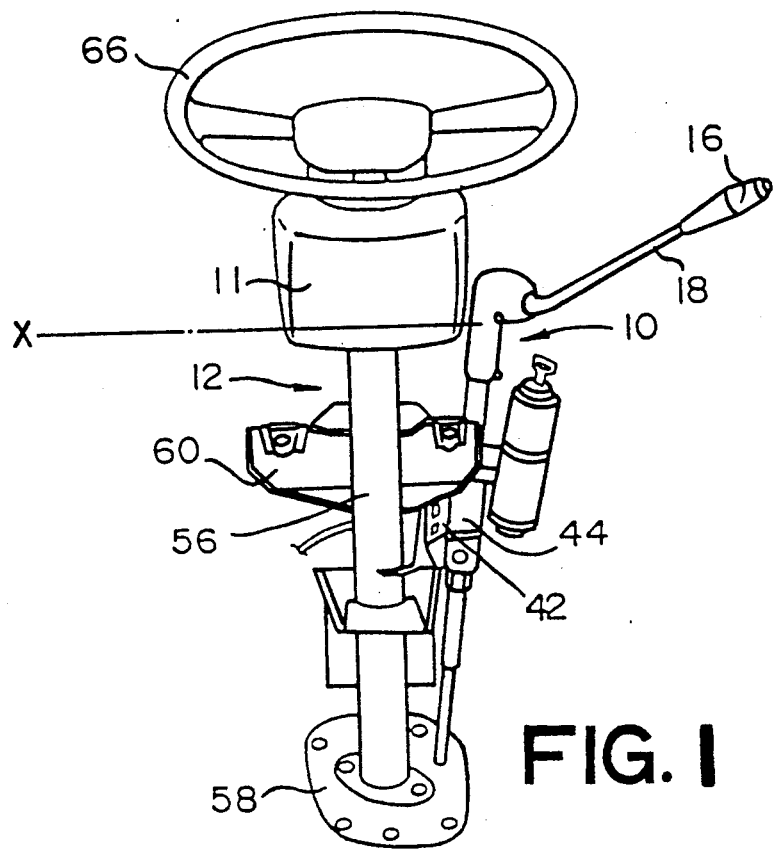
FIG. 1 is a schematic perspective view showing a column shift lever device of a motor vehicle constructed according to one embodiment of the present invention, and surrounding components including a steering column.

Referring first to FIG. 1, reference numeral 12 generally designates a steering column used for a motor vehicle, which is inclined by a suitable angle so as to support a steering wheel 66 at its upper end. The steering column 12 includes a sleeve 56 and a steering shaft (not shown) accommodated within the sleeve 56, such that the steering shaft is disposed in coaxial relationship with the sleeve 56. The upper end of the inclined steering shaft (on the rear side of the vehicle) has the steering wheel 66 fixed thereto, while the lower end of the shaft (on the front side of the vehicle) passes through a bracket 58, and is connected to a steering gear box (not shown) in an engine room of the vehicle. At the intermediate portion of the sleeve 56, the steering column 12 is secured to a vehicle body by means of a bracket 60. The steering column 12 further has a tilting mechanism 11 which allows an upper portion of the steering column 12 to be tilted about a horizontal axis indicated at X in FIG. 1, so as to adjust the position of the steering wheel 66 in the running direction of the vehicle.

Adjacent to the steering column 12, there is provided a column shift lever device 10 disposed in substantially parallel with the steering column 12, as shown in FIG. 1. The column shift lever device 10 includes a hollow or tubular control shaft 20 (FIG. 2), which passes through the bracket 58 and is connected at its lower end to a hydraulic control unit for an automatic transmission installed in the engine room of the vehicle.

The control shaft 20 has an upper end portion (indicated at the right-hand side end of FIG. 2) to which is secured one arm of an L-shaped housing 22. The column shift lever device 10 further includes a shift lever 18 having a bent portion at its intermediate part. This shift lever 18 is supported at a portion adjacent to the bent portion by the end of the other arm of the housing 22, with a pivot pin 24 which pivotally connects the shift lever 18 and the housing 22, such that the shift lever 18 is pivotable about an axis of the pivot pin 24. The shift lever 18 has a knob 16 at its free end remote from the L-shaped housing 22, and a spherical joint 19 at the other end. On the other hand, the control shaft 20 has an inner shaft 28 inserted therethrough, whose upper end is provided with a round hole 26 adapted to receive the spherical joint 19 of the shift lever 18. In operation, when the driver pulls upward the knob 16 of the shift lever 18 (in a direction indicated by an arrow A in FIG. 2) to affect a selecting operation, the spherical joint 19 of the shift lever 18 moves the inner shaft 28 downward (in a direction indicated by an arrow D) the knob 16 so that the shift lever 18 is rotated about the axis or centerline of the inner shaft 28, so as to affect a shifting operation of the transmission, the inner shaft 28 is rotated with the shift lever 18, with the spherfcal joint 19 of the lever 18 fit in the round hole 26 of the inner shaft 28.

Figure 3:
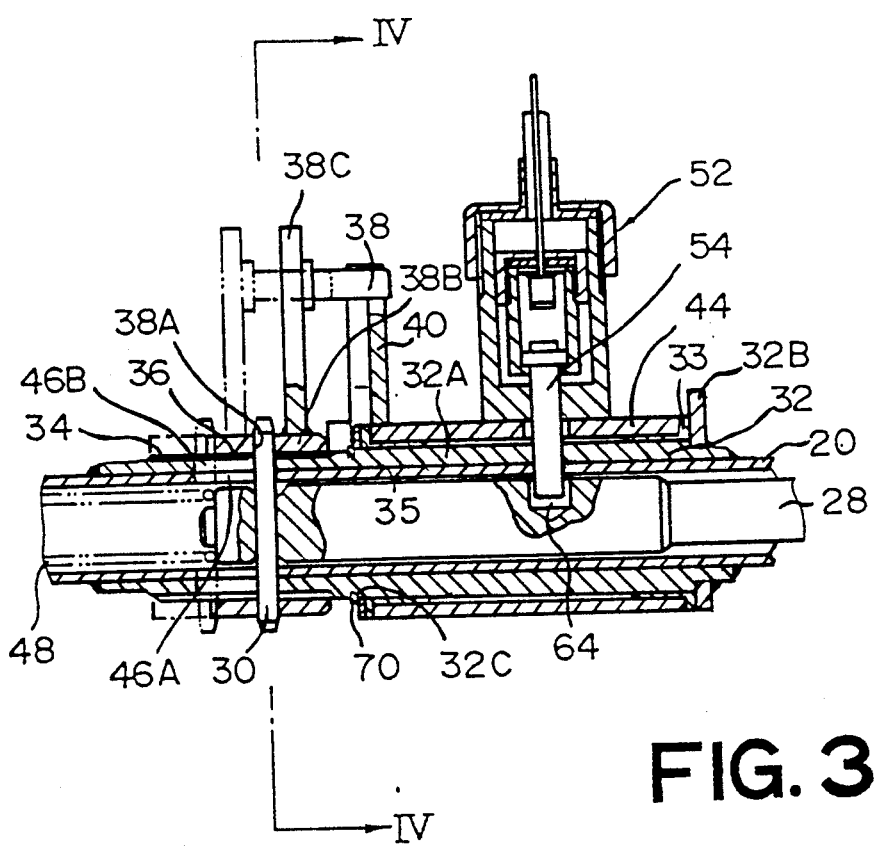
FIG. 3 is an enlarged cross sectional view of a portion of the column shift lever device which is indicated by an arrow C in FIG. 2.

The instant column shift lever device 10 further includes an outer sleeve 32 secured or welded to the outer circumferential surface of the control shaft 20, as shown in FIG. 3. The control shaft 20 has a pair of axially formed elongate holes in the form of slots 46A having a suitable axial length. The slots 46A are located at diametrically opposite circumferential positions of the shaft 20. The outer sleeve 32 also has a pair of slots 46B which have the same axial length as the slots 46A of the control shaft 20 and which are formed in alignment with the slots 46A.

Figure 2:
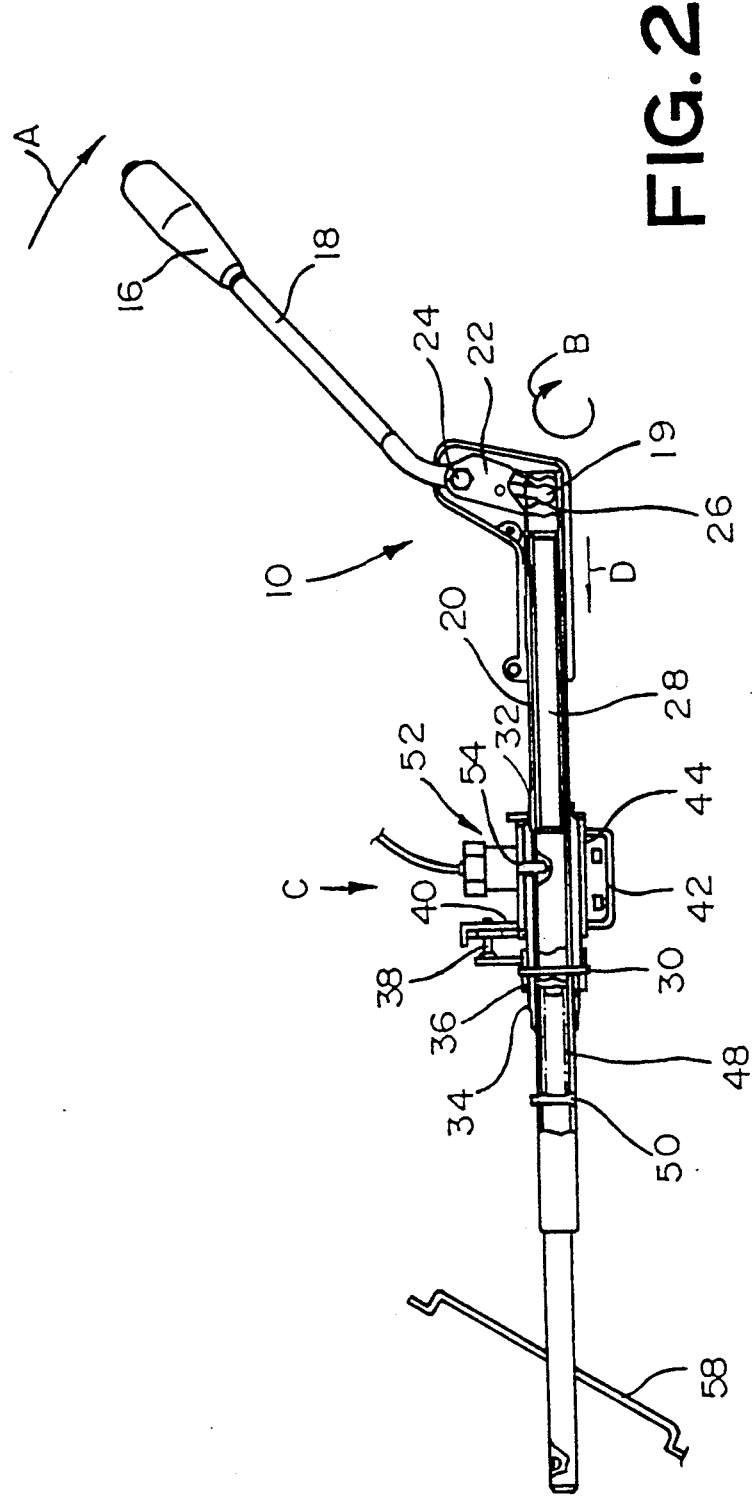
FIG. 2 is a schematic view partially in longitudinal cross section, showing the column shift lever device of FIG. 1, in which the column shift lever device is inclined in a clockwise direction by 90 degrees, with respect to the position of FIG. 1.
Figure 4:
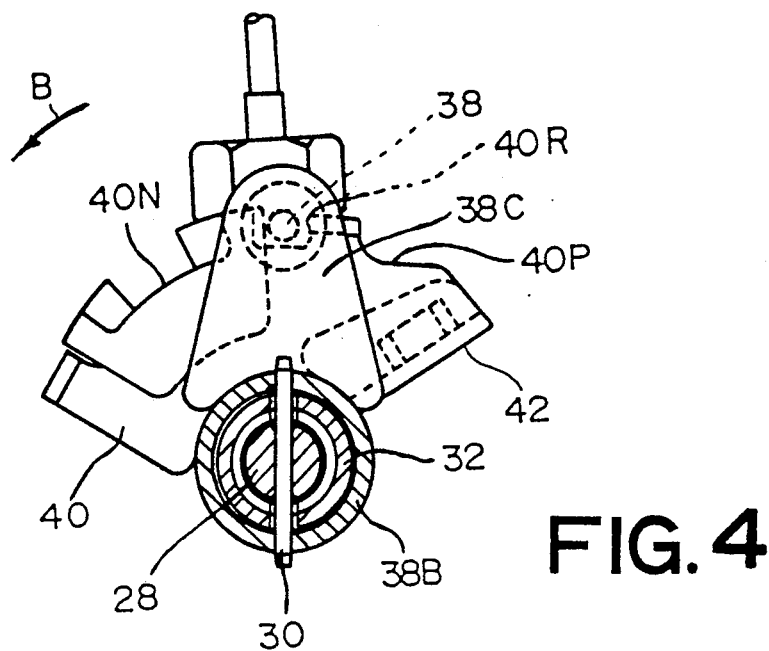
FIG. 4 a cross sectional view taken along lines IV—IV of FIG. 3.

As shown in FIGS. 2, 3 and 4, a fastener pin 30 is secured to a portion of the lower part of the inner shaft 28, so that the fastener pin 30 protrudes radially outwardly from the outer circumferential surface of the inner shaft 28, and passes through the slots 46A of the control shaft 20 and the slots 46B of the outer sleeve 32. In this arrangement, the control shaft 20 and the outer sleeve 32 are axially slidable with respect to the inner shaft 28, and are rotatable with the inner shaft 28.

The outer sleeve 32 is rotatably supported at an upper part 32A by a cylindrical outer casing 44 through interposed bushings 33, 35. The upper end portion of the upper part 32A, which has a relatively small diameter, is provided with a retainer ring 32B welded thereto, while the lower end portion of the upper part 32A has a groove 32C adapted to receive an E-ring 70. Thus, the outer sleeve 32 is retained in position by the retainer ring 32B and the E-ring 70 so that the outer sleeve 32 is axially immovable and rotatable with respect to the outer casing 44.

The outer casing 44 is secured to the steering column 12 through a bracket 42 formed as part of a detent plate 40 which will be described, whereby the column shift lever device 10 is fixedly supported by the steering column 12, as shown in FIG. 1.

Figure 5:
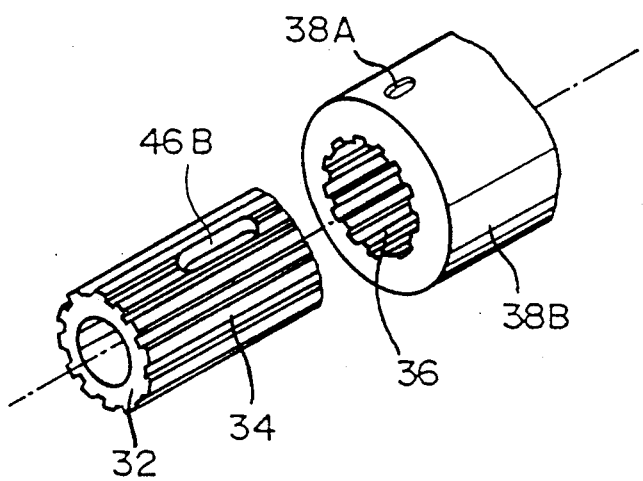
FIG. 5 a perspective view showing splined portions of the column shift lever device of FIG. 2.

The outer circumference of the lower part of the outer sleeve 32 is formed with axially extending involute splines 34, as shown in FIG. 5. These involute splines 34 mesh with corresponding keyways 36 formed in the inner circumferential surface of a detent support sleeve 38B which has a detent pin 38 fixed thereto. The splines 34 and the keyways 36 constitute splined engaging means for permitting a rotary movement of the outer sleeve 32 to be transmitted to the support sleeve 38B while the outer sleeve 32 is rotated with the control shaft 20. In other words, the detent support sleeve 38B is axially slidable on the splined outer circumference of the outer sleeve 32, while the sleeves 38B and 32 are rotatable together.

The detent support sleeve 38B has a pair of round holes 38A formed therethrough, such that the round holes 38A are aligned with the corresponding slots 46A, 46B of the control shaft 20 and outer sleeve 32. The opposite ends of the fastener pin 30 passing through the slots 46A, 46B extend through the round holes 38A. The round holes 38A have a diameter small enough to permit the detent support sleeve 38B to be axially moved and rotated with the inner shaft 28 as a unit by means of the fastener pin 30.

The detent support sleeve 38B is formed with a pin plate 38C welded thereto, such that the pin plate 38C extends radially outwardly of the sleeve 38B in a plane perpendicular to the axis of the sleeve 38B. The pin plate 38C has the above-indicated detent pin 38 at its end portion remote from the sleeve 38B, so that the detent pin 38 extends upward (rightward in FIG. 3) in parallel with the control shaft 20. The free end of the detent pin 38 is adapted to engage the above-indicated detent plate 40.

Figure 6:
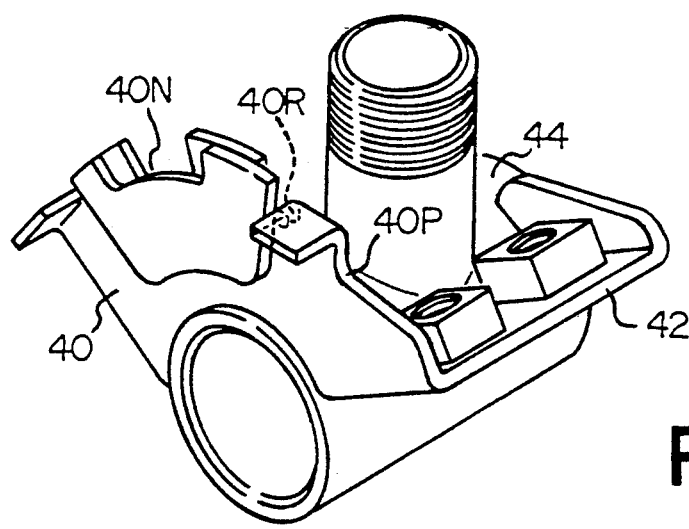
FIG. 6 a perspective view showing in detail a detent plate attached to an outer casing of the column shift lever device.

As shown in FIG. 6, the detent plate 40 having a generally sectoral profile is welded to the outer circumference of lower end portion of the outer casing 44, so as to extend from the lower end portion of the outer casing 44, so as to extend in parallel with the pin plate 38C. The detent plate 40 is formed integrally with the bracket 42 described above, for attachment to the steering column 12. The detent plate 40 has at its outer circumference three arcuate notches 40P, 40R and 40N, which are arranged in this order as seen in FIG. 4 from the bracket 42.

When the detent pin 38 is in engagement with the notch 40P of the detent plate 40, the automatic transmission is held in a parking position (PARKING). With the detent pin 38 in engagement with the notch 40R, the automatic transmission is held in a reverse drive position (REVERSE). With the detent pin 38 in engagement with the notch 40N, the automatic transmission is held in any one of four operating positions, i.e., a neutral position (NEUTRAL), and a first, a second and a third forward drive position (DRIVE, LOW and SECOND), depending upon the position of the detent pin 38 in the circumference direction of the control shaft 20. For the detent pin 38 to be moved from one of the different notches 40P, 40R, 40N of the detent plate 40 to another, the driver is required to first operate the shift lever 18 in the direction A (FIG. 2) for axially moving the inner shaft 28, and then rotate the shift lever 18 about the axis of the inner shaft 28. For the detent pin 38 to be moved from one of the above-indicated four operating positions to another while the pin 38 engages the notch 40N, the driver is required only to rotate the shift lever 18 to a position corresponding to the newly selected position of the transmission. It will be understood from the above description that the detent support sleeve 38B, pin plate 38C, detent pin 38 and detent plate 40 constitute detent means which has a locking position for locking the shift lever in the currently selected shift position which corresponds to one of the operating positions (PARKING, REVERSE, and NEUTRAL/DRIVE/LOW/SECOND) of the automatic transmission, and a release position in which the detent pin 38 is out of engagement with the notches 40P, 40R, 40N.

The control shaft 20 has a rivet 50 (FIG. 2) penetrating therethrough in one diametral direction, such that the rivet 50 is located below the inner shaft 28. Between the rivet 50 and the lower end of the inner shaft 28, there is provided a return spring 48 for biasing the inner shaft 28 toward the housing 22, i.e., in the direction from the release position of the detent means to the locking position (in a direction opposite to the direction D indicated in FIG. 2). Thus, the return spring 48 is compressed when the inner shaft 28 is moved downward in the direction D with the shift lever 18 operated in the direction A.

The instant column shift lever device 10 further includes a safety lock device 52 secured to the outer surface of the outer casing 44. As shown in FIG. 3, the safety lock device 52 has a lock pin 54 extending therefrom toward the inner shaft 28 through the cylindrical walls of the outer casing 44, outer sleeve 32 and control shaft 20. The safety lock device 52 is adapted so that the free end portion of the pin 54 is inserted into a groove 64 formed in the outer circumference of the inner shaft 28 when the shift lever 18 is held in the shift position corresponding to the parking position of the transmission, with a brake pedal of the vehicle placed in a released or non-operated position. In this manner, the shift lever 18 is prevented from being operated under the situation as described just above.

The operation of the thus constructed column shift lever device 10 will be described.

When the driver depresses the brake pedal while the automatic transmission is held in the parking position with the detent pin 38 in engagement with the notch 40P of the detent plate 40, the pin 54 of the safety lock device 52 is disengaged from the groove 64 of the inner shaft 28, to thereby permit the operations of the column shift lever device 10. In this condition, if the driver operates the knob 16 to pull up the shift lever 18, the shift lever 18 is pivoted about the pivot pin 24 in the direction A (FIG. 2), and the spherical joint 19 of the shift lever 18 fit in the round hole 26 of the inner shaft 28 is moved to push down the inner shaft 28 in the direction D as seen in FIG. 2. Thus, the inner shaft 28 is moved downward along the control shaft 20, against a biasing force of the return spring 48. As a result, the fastener pin 30 secured to the inner shaft 28 is moved downward to thereby cause the detent support sleeve 38B and the detent pin 38 to move downward. In this way, the detent support sleeve 38B having the keyways in its inner surface is allowed to slide on the involute splines 34 of the outer sleeve 32. Consequently, the detent pin 38 is disengaged from the notch 40P of the detent plate 40.

In this condition, a gear shifting operation of the transmission can be affected while the detent pin 38 is released from the notches of the detent plate 40. When the driver operates the knob 16 to rotate the shift lever 18 about the axis of the inner shaft 28 in the direction B (FIG. 2), the inner shaft 28 and the fastener pin 30 are accordingly rotated about the same axis in the same direction B. Since the control shaft 20 and the outer sleeve 32 are rotated with the inner shaft 28, and the involute splines 34 of the outer sleeve 32 mesh with the keyways 36 of the detent support sleeve 38B, the detent support sleeve 38B and the detent pin 38 are rotated in the rotating direction B of the inner shaft 28. If the driver releases the shift lever 18 while the detent pin 38 is in alignment with the notch 40N of the detent pin 40, the inner shaft 28 is axially moved upward under the biasing force of the return spring 48. As a result, the fastener pin 30 is moved upward to cause the detent support sleeve 38B to move upward in its axial direction while guided by the involute splines 34 of the outer sleeve 32. Consequently, the detent pin 38 supported by the sleeve 38B is moved upward for engagement with the notch 40N of the detent plate 40.

While the operations of the shift lever 18 described above are concerned with the shifting of the transmission from the parking position to the neutral or forward drive positions (NEUTRAL, DRIVE, LOW, SECOND), the similar operations apply to other shifting operations of the transmission.

In the column shift lever device 10 according to the illustrated embodiment, the outer sleeve 32 welded to the control shaft 20 is rotatably supported by the coaxial cylindrical outer casing 44, whereby the rigidity of the column shift lever device 10 (more precisely, the control shaft 20) is enhanced. Further, the detent support sleeve 38B having the detent pin 38 engageable with the detent plate 40 is slidably mounted on the outer sleeve 32 welded to the control shaft 20, by means of the splined engaging means 34, 36 which permits relative axial movements and concurrent rotations of the detent support sleeve 38B and the outer sleeve 32 (control shaft 20). Therefore, this manner of providing the detent support sleeve 38B of the detent means 38B, 38, 40 merely requires forming the elongate slots 46A, 46B through the outer sleeve 32 and the control shaft 20, respectively. In this arrangement, the control shaft 20 and the outer sleeve 32 are given a high degrees of bending and torsional strength, thereby assuring improved operating stability and smoothness of the shift lever 18. Since the axial movement of the detent pin 38 with respect to the detent plate 40 is carried out by means of the splined engaging means 34, 36, the driver can easily operate the shift lever 18 with a reduced operating force, with a reduced radial play between the control shaft 20 and the detent support sleeve 38B, while assuring improved durability of the engaging portions of the detent support sleeve 38B and the outer sleeve 32. Also in the instant column shift lever device 10, the detent pin 38 and detent plate 40 are disposed within the driver's compartment, thereby eliminating the conventionally required space in the engine room for these components. That is, the space in the engine room required for the shift lever device is reduced by an amount corresponding to the detent means.

While the outer sleeve 32 and the control shaft 20 are formed as separate parts and are welded together in the illustrated embodiment, the outer sleeve 32 may be formed integrally with the control shaft 20.

In the illustrated embodiment, the splines 34 are formed on a portion of the outer sleeve 32, the splines may be formed on an exclusively designed splined member secured to the outer circumferential surface of the tubular control shaft 20.

While the present invention has been described in the presently preferred embodiment, for illustrative purpose only, the invention may be embodied with other changes, modifications or alterations which may occur to those skilled in the art, without departing from the scope and spirit of the invention defined in the following claims.

What is claimed is:

1. A column shift lever device operatively connected to an automatic transmission of a motor vehicle and supported by a steering column which has a tiltable upper portion supporting a steering wheel, said column shift lever device comprising:
   a shift lever which is manipulated by a vehicle driver so as to place the automatic transmission in one of a plurality of operating positions;
   a tubular control shaft having an upper end to which said shift lever is connected, said tubular control shaft having at least one axially extending elongate hold formed therethrough;
   an inner shaft accommodated within said tubular control shaft, said inner shaft having a fastener member protruding therefrom through said at least one elongate hole, so that said inner shaft is axially movable relative to and rotatable with said control shaft;
   a stationary cylindrical outer casing disposed around said control shaft is coaxial relationship therewith, for rotatably supporting said control shaft at a portion thereof below said tiltable upper portion;
   detent means having a detent pin for locking said shift lever in one of a plurality of shift positions corresponding to said operating positions of the automatic transmission, said detent means including a detent support sleeve which supports said detent pin and which is connected to said inner shaft through said fastener member;

splined engaging means provided between an outer circumference of said control shaft and an inner circumference of said detent support sleeve, for permitting a relative axial movement and a concurrent rotation of said control shaft and said detent support sleeve and a bracket secured to said cylindrical outer casing and said steering column, for fixing said control shaft to the steering column.

2. A column shift lever device according to claim 1, further comprising an outer sleeve fixedly fitted on said outer circumference of said control shaft and having axial splines formed over an outer circumferential surface thereof.

3. A column shift lever device according to claim 2, wherein said outer sleeve has at least one axially extending elongate hold through which said fastener member extends for connection to said detent support sleeve of said detent means.

4. A column shift lever device operatively connected to an automatic transmission of a motor vehicle and supported by a steering column which has a tiltable upper portion supporting a steering wheel, said column shift lever device comprising:

a shift lever which is manipulated by a vehicle driver so as to place the automatic transmission in one of a plurality of operating positions;

a tubular control shaft having an upper end to which said shift lever is connected, said tubular control shaft having at least one axially extending elongate hole formed therethrough;

an inner shaft accommodated within said tubular control shaft, said inner shaft having a fastener member protruding therefrom through said at least one elongate hold, so that said inner shaft is axially movable relative to and rotatable with said control shaft;

a stationary cylindrical outer casing disposed around said control shaft in coaxial relationship therewith, for rotatably supporting said control shaft at a portion thereof below said tiltable upper portion;

detent means having a detent pin for locking said shift lever in one of a plurality of shift positions corresponding to said operating positions of the automatic transmission, said detent means including a detent support sleeve which supports said detent pin and which is connected to said inner shaft through said fastener member; and splined engaging means provided between an outer circumference of said control shaft and an inner circumference of said detent support sleeve, for permitting a relative axial movement and a concurrent rotation of said control shaft and said detent support sleeve, an outer sleeve fixedly fitted on said outer circumference of said control shaft and having axial splines formed over an outer circumferential surface thereof, wherein said splined engaging means consists of said axial splines of said outer sleeve and corresponding keyways formed in an inner circumferential surface of said detent support sleeve, said axial splines engaging said keyways so that the detent support sleeve is axially slidable on the outer sleeve.

5. A column shift lever device operatively connected to an automatic transmission of a motor vehicle and supported by a steering column which has a tiltable upper portion supporting a steering wheel, said column shift lever device comprising:

a shift lever which is manipulated by a vehicle driver so as to place the automatic transmission in one of a plurality of operating positions;

a tubular control shaft having an upper end to which said shift lever is connected, said tubular control shaft having at least one axially extending elongate hole formed therethrough;

an inner shaft accommodated within said tubular control shaft, said inner shaft having a fastener member protruding therefrom through said at least one elongate hold, so that said inner shaft is axially movable relative to and rotatable with said control shaft;

a stationary cylindrical outer casing disposed around said control shaft in coaxial relationship therewith, for rotatably supporting said control shaft at a portion thereof below said tiltable upper portion;

detent means having a detent pin for locking said shift lever in one of a plurality of shift positions corresponding to said operating positions of the automatic transmission, said detent means including a detent support sleeve which supports said detent pin and which is connected to said inner shaft through said fastener member; and splined engaging means provided between an outer circumference of said control shaft and an inner circumference of said detent support sleeve for permitting a relative axial movement and a concurrent rotation of said control shaft and said detent support sleeve, wherein said detent means further includes a stationary detent plate having a plurality of notches which correspond to said operating positions of the automatic transmission, said detent pin engaging one of said plurality of notches so as to establish a corresponding one of the operating positions of the automatic transmission, and wherein said detent plate is secured to said cylindrical outer casing, while said detent support sleeve is rotatable and axially movable with said inner shaft.

6. A column shift lever device operatively connected to an automatic transmission of a motor vehicle and supported by a steering column which has a tiltable upper portion supporting a steering wheel, said column shift lever device comprising:

a shift lever which is manipulated by a vehicle driver so as to place the automatic transmission in one of a plurality of operating positions;

a tubular control shaft having an upper end to which said shift lever is connected, said tubular control shaft having at least one axially extending elongate hold formed therethrough;

an inner shaft accommodated within said tubular control shaft, said inner shaft having a fastener member protruding therefrom through said at least one elongate hole, so that said inner shaft is axially movable relative to and rotatable with said control shaft;

a stationary cylindrical outer casing disposed around said control shaft in coaxial relationship therewith, for rotatably supporting said control shaft at a portion thereof below said tiltable upper portion;

detent means having a detent pin for locking said shift lever in one of a plurality of shift positions corresponding to said operating positions of the automatic transmission, said detent means including a detent support sleeve which supports said detent pin and which is connected to said inner shaft through said fastener member; and splined engaging means provided between an outer circumference of said control shaft and an inner circumference of said detent support sleeve for permitting a relative axial movement and a concurrent rotation of said control shaft and said detent support sleeve, wherein said operating positions of the automatic transmission has a parking position, a reverse drive position, a neutral position, and a plurality of forward drive positions, further comprising a safety lock device operable when the automatic transmission is placed in said parking position while a brake pedal of the vehicle is placed in a released position, said safety lock device including a pin which is engageable with a groove formed in an outer circumferential surface of said inner shaft.

7. A column shift lever device operatively connected to an automatic transmission of a motor vehicle and supported by a steering column which has a tiltable upper portion supporting a steering wheel, said column shift lever device comprising:

a shift lever which is manipulated by a vehicle driver so as to place the automatic transmission in one of a plurality of operating positions;

a tubular control shaft having an upper end to which said shift lever is connected, said tubular control shaft having at least one axially extending elongate hole formed therethrough;

an inner shaft accommodated within said tubular control shaft, said inner shaft having a fastener member protruding therefrom through said at least one elongate hole, so that said inner shaft is axially movable relative to and rotatable with said control shaft;

a stationary cylindrical outer casing disposed around said control shaft in coaxial relationship therewith, for rotatably supporting said control shaft at a portion thereof below said tiltable upper portion;

detent means having a detent pin for locking said shift lever in one of a plurality of shift positions corresponding to said operating positions of the automatic transmission, said detent means including a detent support sleeve which supports said detent pin and which is connected to said inner shaft through said fastener member;

splined engaging means provided between an outer circumference of said control shaft and an inner circumference of said detent support sleeve for permitting a relative axial movement and a concurrent rotation of said control shaft and said detent support sleeve; and a return spring for biasing said inner shaft, wherein said detent means has a locking position for locking said shaft lever and a release position, said return spring biasing said inner shaft in a direction from said release position toward said locking position.

* * * * *